United States Patent [19]

Yamada et al.

[11] Patent Number: 5,103,400
[45] Date of Patent: Apr. 7, 1992

[54] DESTINATION GUIDANCE METHOD OF VEHICLE NAVIGATING

[75] Inventors: Takashi Yamada; Shoji Yokoyama; Koji Sumiya; Shuzo Moroto, all of Anjo, Japan

[73] Assignees: Kabushiki Kaisha Shinsangyokaihatsu; Aisin AW Co., Ltd., both of Japan

[21] Appl. No.: 724,475

[22] Filed: Jun. 28, 1991

Related U.S. Application Data

[63] Continuation of Ser. No. 630,753, Dec. 21, 1990, abandoned, which is a continuation of Ser. No. 408,497, filed as PCT/JP88/01303, Dec. 23, 1988, abandoned.

[30] Foreign Application Priority Data

Dec. 28, 1987 [JP] Japan ................................. 62-333054

[51] Int. Cl.⁵ ............................................. G06F 15/50
[52] U.S. Cl. ..................................... 364/444; 364/449; 73/178 R; 340/990; 340/995
[58] Field of Search .................. 364/443, 444, 449; 73/178 R; 340/988, 990, 995

[56] References Cited

U.S. PATENT DOCUMENTS

| | | | |
|---|---|---|---|
| 4,646,089 | 2/1987 | Takanabe et al. | 364/449 |
| 4,763,270 | 8/1988 | Itoh et al. | 340/988 |
| 4,780,717 | 10/1988 | Takanabe et al. | 364/449 |
| 4,782,447 | 11/1988 | Lieno et al. | 364/449 |
| 4,796,189 | 1/1989 | Nakayama et al. | 340/990 |
| 4,812,845 | 3/1989 | Yamada et al. | 364/449 |
| 4,827,420 | 5/1989 | Musa | 364/449 |

*Primary Examiner*—Gary Chin
*Attorney, Agent, or Firm*—Lorusso & Loud

[57] ABSTRACT

A navigating apparatus which outputs information for guidance to a destination comprises an input device (1) for inputting a destination and a present position, a memory (4) in which guidance information is stored, an arithmetic unit (2) for determining optimum guidance information from the information input from the input device (1) and a display (3) for indicating the guidance information, the memory (4) having data of a plurality of parking lots at least in a destination and the arithmetic unit (2) serving to select the plurality of parking lots and guide the driver along the courses thereto in the destination. This apparatus enables the driver to go to a nearby parking lot by exploration of a course to the next parking lot at the shortest distance and guidance thereto even if a certain parking lot is full of cars in a destination.

6 Claims, 17 Drawing Sheets

FIG. 6

NODE LINE DATA

| NODE NO. | EAST LONGI- TUDE | NORTH LATI- TUDE | ATTRI- BUTE |
|---|---|---|---|
| 0001 | 135... | 35... | 01 |
| 0002 | 135... | 35... | 00 |
| ⋮ | | | |

INTERSECTION LIST

| CODE NO. | INTERSEC- TION NAME | INTER- SEC- TION NO. | LANDMARK | ATTRI- BUTE | CONNEC- TED INTER- SECTION NO. ① | CONNEC- TED INTER- SECTION NO. ② |
|---|---|---|---|---|---|---|
| 0101 | GION | 10 | MARUYAMA PARK | 01 | 2147 | 2152 |
| 0102 | KITANO HAKUBAI- CHO | 398 | GASORLINE STATION | 00 | 59 | 3096 |
| | | | | | | |

FIG. 8

DESTINATION LIST

| CODE NO. | DESTINATION NAME | PARKING LOT NO. | CONNECTED INTERSECTION ① | CONNECTED INTERSECTION ② | PARKING LOT DIRECTION | PHOTOGRAPH ① | PHOTOGRAPH ② | OUTLET PHOTOGRAPH NO. | BLOCK | EAST LONGITUDE | NORTH LATITUDE |
|---|---|---|---|---|---|---|---|---|---|---|---|
| 0001 | ARASHI-YAMA | 1 | 2103 | 2097 | −1 | 1121 | 0 | 0 | 0A00 | 135⋯ | 35⋯ |
| 0012 | KINKAKU-JI | 1 | 2153 | 2265 | +1 | 2019 | 2020 | 2021 | 00FF | 135⋯ | 35⋯ |

FIG. 9

PARKING LOT DATA

| DESTINATION NAME | DESTINATION CODE | NUMBER OF PARKING LOTS | PARKING LOT NUMBER | CONNECTED INTERSECTION ① | CONNECTED INTERSECTION ② | EAST LONGITUDE | NORTH LATITUDE |
|---|---|---|---|---|---|---|---|
| KINKAKU-JI | 1 | 3 | 1 | 10 | 11 | 135.1 | 35.2 |
| | | | 2 | 12 | 13 | 134.9 | 35.2 |
| | | | 3 | 9 | 10 | 135.0 | 35.0 |
| KIYOMIZU TERA | 2 | 5 | 1 | 50 | 51 | 135.3 | 35.6 |
| | | | 2 | 49 | 50 | 135.4 | 35.5 |
| | | | 3 | 53 | 54 | 135.5 | 35.5 |

ROAD DATA

| ROAD NO. | STARTING POINT INTERSECTION NO. | TERMINAL INTERSECTION NO. | NO. OF ROAD HAVING THE SAME STARTING POINT | NO. OF ROAD HAVING THE SAME TERMINAL | ROAD THICKNESS | ROAD CLOSED ① | ROAD CLOSED ② | UNNECESSARY GUIDANCE | PHOTOGRAPH NO. | NUMBER OF NODES | TOP ADDRESS OF NODE COLUMN DATA |
|---|---|---|---|---|---|---|---|---|---|---|---|
| 1 | 1 | 2 | 7 | 4 | 1 | — | — | 3 | 1 | 15 | 100 |
| 2 | 2 | 1 | 3 | 8 | 1 | — | — | 7 | 2 | 13 | 200 |
| 3 | 2 | 3 | 2 | 3 | 2 | — | — | 5 | 3 | 9 | 300 |
| 4 | 3 | 2 | 5 | 6 | 2 | — | — | 2 | 4 | 20 | 400 |
| 5 | 3 | 4 | 4 | 7 | 2 | 6 | — | 8 | 5 | 25 | 500 |
| 6 | 4 | 2 | 8 | 1 | 1 | 3 | 2 | — | 6 | 30 | 600 |
| 7 | 1 | 4 | 1 | 5 | 0 | — | — | — | 7 | 9 | 700 |
| 8 | 4 | 1 | 6 | 2 | 0 | — | — | 1 | 8 | 3 | 800 |

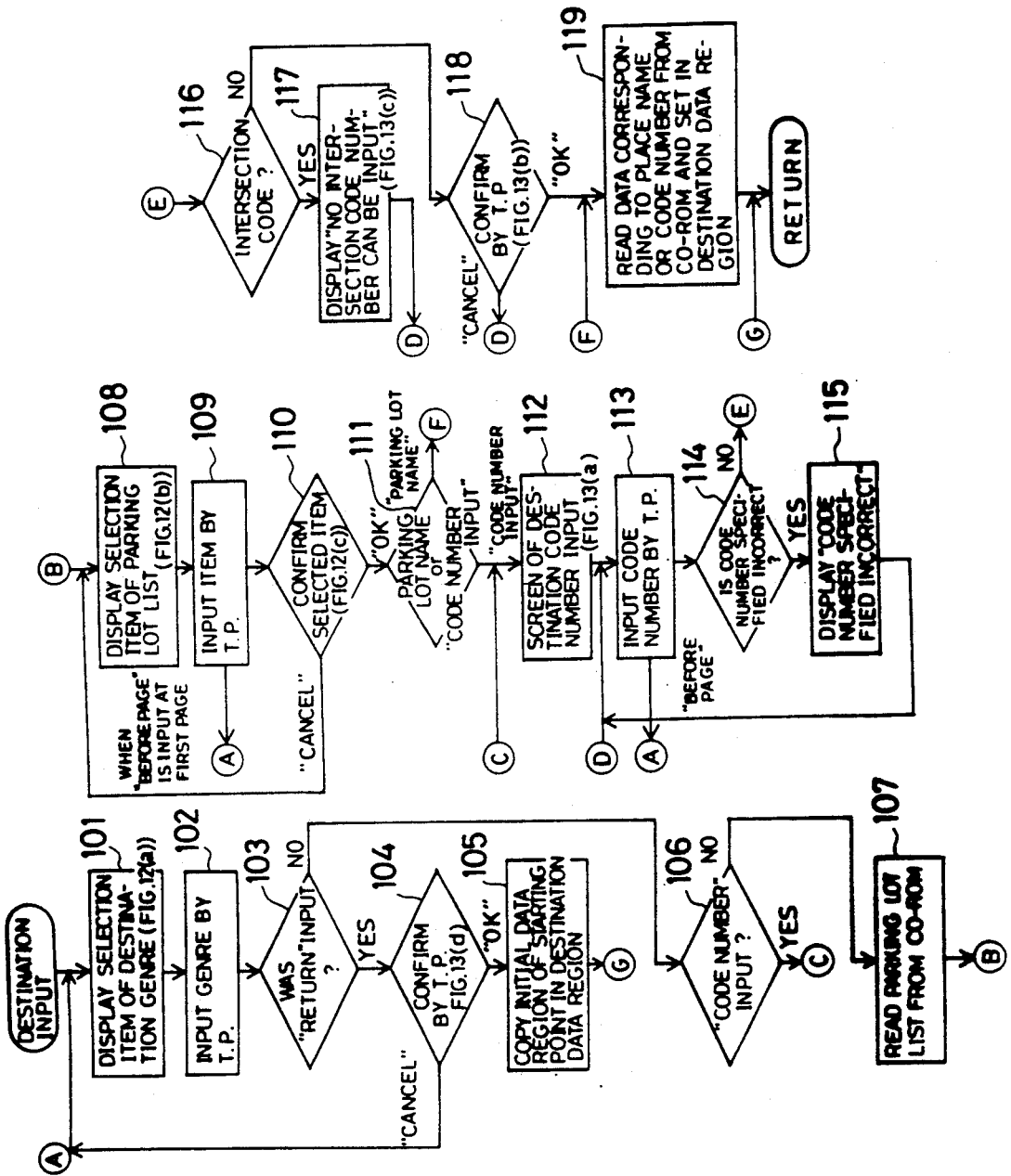

FIG.12(a)

DESTINATION INPUT | SELECT DESTINATION

THE STARTING POINT IS _____.
IF THE STARTING POINT INCORRECT, CHANGE THE STARTING POINT BY PUSHING THE LEFT HELP BUTTON

- SIGHT-SEEING
- LODGING
- MEAL
- SOUVENIR
- CODE NUMBER INPUT
- RETURN

RED

FIG.12(b)

SELECTED GENRE

SIGHT-SEEING | SELECT DESIRED PLACE

- ARASHI-YAMA
- IMPERIAL PALACE
- KINKAKU-JI
- BOTANICAL GARDENS
- GION
- NANZEN-JI
- GINKAKU-JI
- CODE NUMBER INPUT
- BEFORE PAGE
- NEXT PAGE

FIG.12(c)

SIGHT SEEING | OK ?

- ARASHI-YAMA
- IMPERIAL PALACE
- KINKAKU-JI
- BOTANICAL GARDENS
- GION
- NANZEN-JI
- GINKAKU-JI
- CODE NUMBER INPUT
- OK
- CANCEL

FIG. 13(a)

INPUT DESTINATION CODE NUMBER

| 1 | 2 | 3 |
| 4 | 5 | 6 |
| 7 | 8 | 9 |
| OK | 0 | CANCEL |

BEFORE PAGE

DESTINATION IS _____

| 1 | 2 | 3 |
| 4 | 5 | 6 |
| 7 | 8 | 9 |
| OK | 0 | CANCEL |

BEFORE PAGE

NO INTERSECTION CODE NUMBER CAN BE INPUT

| 1 | 2 | 3 |
| 4 | 5 | 6 |
| 7 | 8 | 9 |
| OK | 0 | CANCEL |

BEFORE PAGE

FIG. 13(d)

RETURN ?

YES    NO

FIG. 15(a)

INPUT STARTING INTERSECTION CODE NUMBER

CONTINUE TRAVELING, STOP IMMEDIATERY AFTER PASSAGE THROUGH INTERSECTION WITH NAME AND INPUT CODE NUMBER THEREOF (REFER TO INSTRUCTION MANUAL)

BEFORE PAGE | CODE NUMBER INPUT

FIG. 15(b)

INPUT INTERSECTION CODE NUMBER

| 1 | 2 | 3 |
| 4 | 5 | 6 |
| 7 | 8 | 9 |
| OK | 0 | CANCEL |

BEFORE PAGE

INTERSECTION NAME IS _____

| 1 | 2 | 3 |
| 4 | 5 | 6 |
| 7 | 8 | 9 |
| OK | 0 | CANCEL |

BEFORE PAGE

DESTINATION GUIDANCE METHOD OF VEHICLE NAVIGATING

This application is a continuation of application Ser. No . 07/630,753, filed Dec. 21, 1990, now abandoned, which is a continuation of application Ser. No. 07/408,497, filed as PCT/JP88/01303, Dec. 23, 1988, now abandoned.

DESCRIPTION

1. Technical Field

The present invention relates to a vehicle navigating apparatus which outputs guidance information and shows the course to a destination.

2. Background Art

Vehicle navigating apparatuses serve to show drivers unacquainted with a destination the course to that destination, and such navigating apparatuses have been extensively developed in recent years.

Conventional navigating apparatuses employ a route-matching method in which course guidance is made from a starting point to a destination along a course which is previously set. When a course is indicated, some of the conventional navigating apparatuses show the course superposed on a map displayed on a CRT screen. When the next intersection at which a vehicle should turn is indicated along the course previously set, the distance to the next intersection is displayed by using numerals or a graph. In such navigating apparatuses, when a vehicle turns at an intersection, the driver decides the next intersection at which the vehicle will turn while seeing the course displayed on a map or by determining the distance to the intersection at which the vehicle will turn from the numerals or the graph displayed.

However, such conventional navigating apparatuses deficient that, since course guidance is performed along a course previously set from the starting point to a destination, as described above, then, when a vehicle deviates from the course previously set owing to misjudgment of intersections or the like, travel under the guidance of the navigating apparatuses cannot be continued until the vehicle is returned to the course previously set. There is also a problem in that, although a decision is made as to whether or not a vehicle has passed through a given intersection in accordance with the course assuming that the distance and turn are detected by a distance sensor and a steering angle sensor, the detection error is often actually great and this easily leads to misjudgment.

For example, in Japanese Patent Unexamined Publication No. 84699/1985, only one destination is set for one course along which a driver is guided to the destination.

In the above-mentioned Japanese Patent Unexamined Publication No. 84699/1985, however, there is a problem in that, when the destination is a parking lot, if the parking lot is filled with cars, it is necessary to input a new starting point and destination and set a new course for guiding the driver to a neighboring parking lot.

Thus, the applicant proposes as a substitute for the above-mentioned route-matching method a novel navigating apparatus which must be called the exploration method.

In this method, the coordinates of a plurality of points such as intersections, landmarks and so on are determined so that, when a destination is input, at each of the points, the course to the destination is explored, and the guidance information therefor is output. Navigation can thus be performed even if a distance sensor, a steering angle sensor and a geomagnetic sensor are damaged or none of these sensors is provided. It is therefore possible to easily guide the driver to a destination even if the vehicle deviates from the course or the destination is changed. In this method, a method of inputting simple positions such as destinations, present positions and so on is an important problem to be solved.

The present invention has been achieved with a view to solving the above-described problem, and it is an object of the present invention to provide a destination guidance method of a vehicle navigating apparatus which is capable of guiding a driver to a neighboring parking lot when a parking lot to which the driver is first guided is filled with cars.

It is another object of the present invention to provide a guidance method exhibiting an effect particularly when applied to a navigation method in which the coordinates of a plurality of points such as intersections, landmarks and so forth are determined so that, when a destination is input, at each point, a course to the destination is explored and guidance information therefor is output.

SUMMARY OF INVENTION

To achieve the above-mentioned objects, a destination guidance method of a vehicle navigating apparatus of the present invention which outputs guidance information for arriving at a destination comprises an input device having destination input means and present position input means, a memory in which guidance information is stored and a display for outputting the guidance information on the basis of information input from the input device, the memory having data on a plurality of parking lots in the destination so as to enable the selection of a plurality of parking lots and the guidance along courses to the parking lots.

In the present invention, therefore, for example, a first parking lot is first automatically set when a present point and a destination are input (Steps 301, 302), and a decision is made as to whether or not the driver will go to the next parking lot in Step 305 when the driver reaches the first parking lot through exploration of the course and guidance along the course. If parking is possible, operation is completed, while if the first parking lot is full, another parking lot is set in Step 306, and a decision is made as to whether or not another parking lot is present in Step 307. If another parking lot is present, the operation returns to Step 303 where the exploration of the course and guidance along the course are performed.

The present invention is therefore capable of guiding the driver to a nearby parking lot when a parking lot to which the driver is first guided is full of cars.

BRIEF DESCRIPTION OF THE DRAWINGS

FIGS. 5 to 10(b) are drawings provided for the data structure of the present invention;

FIG. 11 is a flow chart in an example of a method of inputting a destination;

FIGS. 12(a)-12(c) and 13(a)-(13b) are drawings of examples of a screen display for the destination;

FIGS. 15(a)-15(c) and 16(a)-16(b) are drawings of examples of a screen display for the present position;

FIGS. 18 to 20 are drawings provided for explaining a destination guidance method of a vehicle navigating apparatus of the present invention, in which FIGS. 18 and 19(a)-19(b) are flow charts of the processing thereof; and FIG. 20 is a drawing of an example of a screen display for the guidance.

BEST MODE FOR CARRYING OUT THE INVENTION

Figure 1:
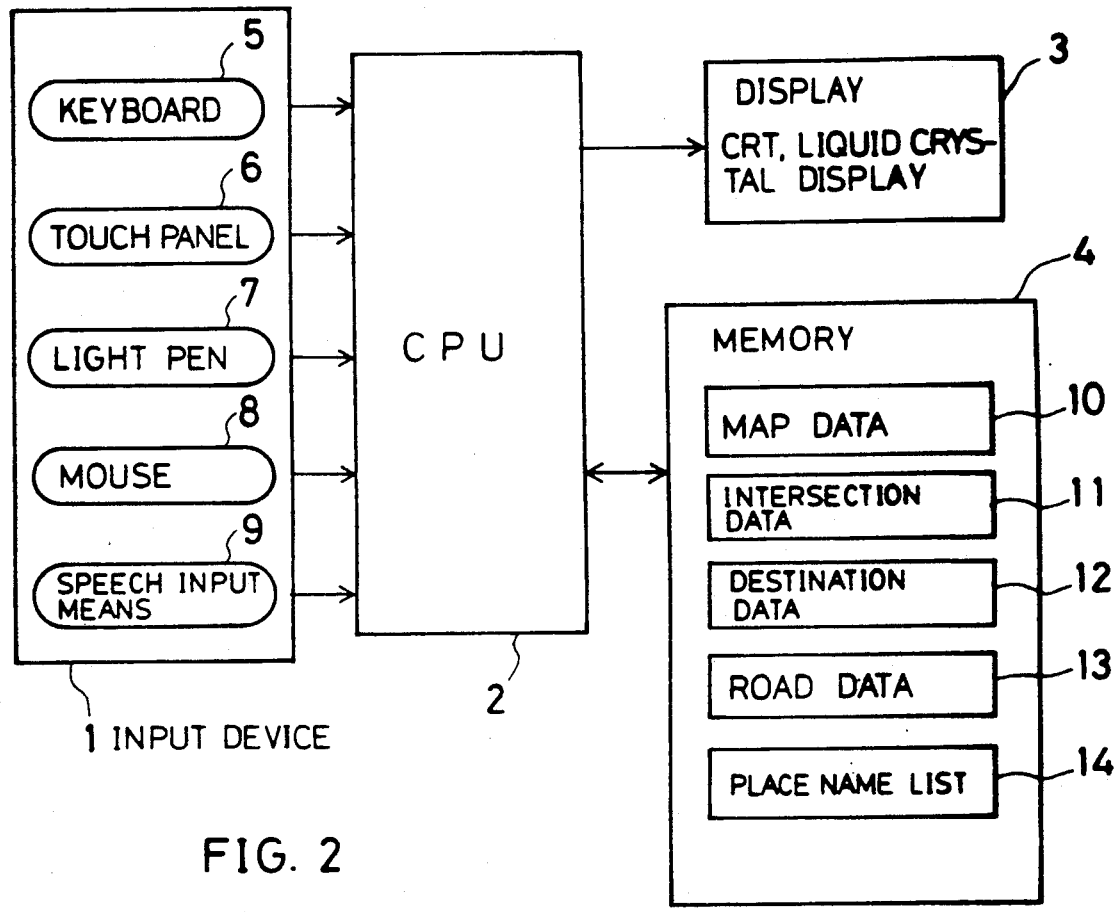
FIG. 1 is a drawing of the arrangement of a first embodiment of a navigating apparatus in accordance with the present invention.

In FIG. 1, reference numeral 1 denotes an input apparatus; reference numeral 2, CPU; reference numeral 3, a display such as CRT, a liquid crystal display or the like; and reference numeral 4, a memory. A keyboard 5 comprises ten keys or function keys so as to enable the input of destinations and present positions using given code numbers. A touch panel 6, a light pen 7, a mouse 8 or speech input means 9 can be used in place of the keyboard 5.

A memory 4 is a memory such as CD-ROM or the like in which network data and information on respective points such as destinations and present positions are stored, the map data 10, intersection list 11, destination list 12, road data 13, place name list 14 and so on, which are described below, being stored therein.

The CPU 2 serves to set information for arrival at a destination by exploring a course at each of the points stored in the memory 4 and to store the information in a memory such as RAM or the like when the destination is specified by inputting from the input means 1.

Figure 2:
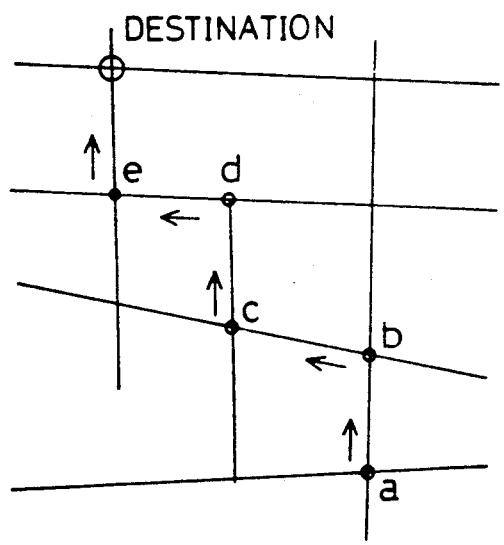
FIG. 2 is a drawing of an example of a course.

The display 3 serves to output information for guidance of the present position when information of the present position is input from the input means 1, for example, when only intersections are considered as points, the information for guidance comprising the indication to turn to the right or the left at the next intersection which is provided at each of the guidance points for the purpose of arrival at the destination. When there is a second intersection adjacent to the next intersection at which the vehicle turns, the guidance information may of course contain indicative information for the direction of the turn at the first intersection and the lane to be taken at the intersection, as well as the direction of the turn at the second intersection. For example, the display 3 outputs information for guidance along the course to the destination in the order of a, b, c . . . shown in FIG. 2.

Figure 3:
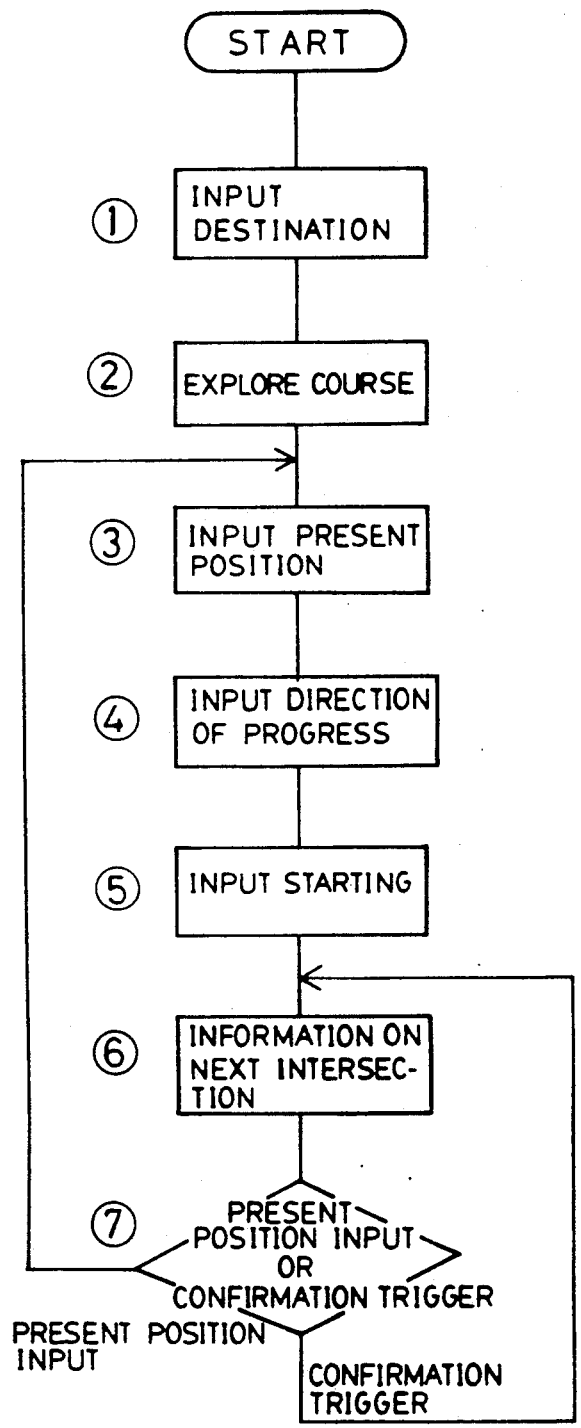
FIG. 3 is a drawing provided for explaining the flow of navigation processing.

A description will now be given of the flow of processing of the navigating apparatus in accordance with the present invention with reference to FIG. 3.

When a destination code is first input by the driver (Step 1), the processing is put in a course exploring mode in which the information with respect to all points other than the destination are set (Step 2). When the exploration of a course is completed, the processing is put in a present position input mode in which, when the present position is input (Step 3), the direction of progress at the present position is output (Step 4). When an intersection confirming trigger is then input (start input, Step 5), information with respect to the next intersection is output (Step 6). Supervision is then made as to whether the intersection confirming trigger or the present position input button signal is input (Step 7). When the intersection confirming trigger is input, the processing returns to Step 6, while when the present position input button signal is input, the processing returns to Step 3. In other words, in this system, if the vehicle follows the guidance, the trigger is input each time an intersection is confirmed, while if the driver finds that the vehicle deviates from the course and runs into another intersection, the present position input button is pushed. Thus, the guidance information with respect to the intersections on the course to the destination is output in turn each time the trigger is input, while the present position input mode is taken when the present position input button is pushed.

Figure 4A:
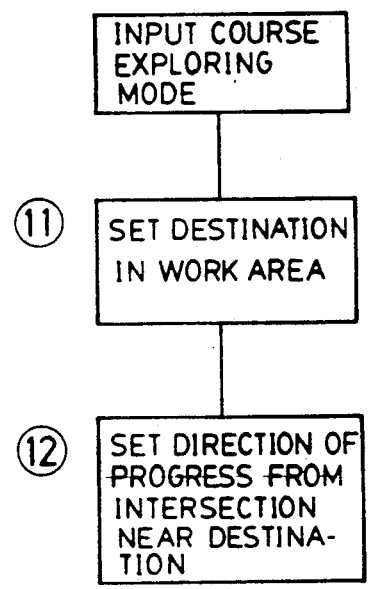
FIGS. 4(a)-4(b) drawings provided for explaining the operation of exploring a course.
Figure 4B:
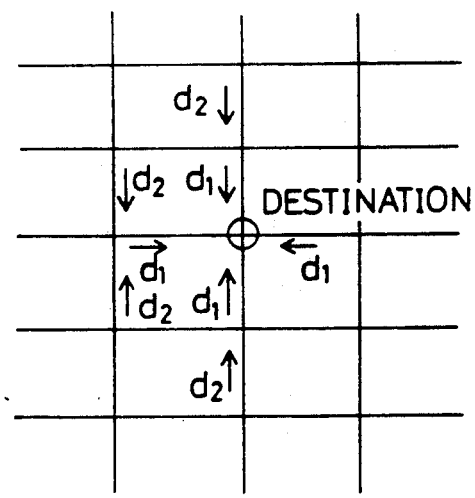

In the course exploring process in Step 2, as shown in FIG. 4(a), the course exploring mode is entered, a destination is first set in the work area (Step 11), and then the direction of progress from the intersection near the destination is set (Step 12). During setting of the direction of progress, a direction of progress $d_1$ at the intersection before the destination is first set, and a direction of progress $d_2$ at the intersection before the first intersection is then set, as shown in FIG. 4(b). Such exploration of the course may be performed after the processing in Step 3 shown in FIG. 3. In this case, the exploration of the course is performed each time the present position is input. In addition, since the guidance information is output along the route which is set from the results of the exploration of the course, the number of the intersections to be considered is limited. Therefore, guidance information for the intersections only may be output at a minimum.

A description will now be given of the method of inputting the destination or the present position with reference to FIGS. 5 to 11.

FIGS. 5 to 9 show the data structure of the present invention.

Figure 5A:
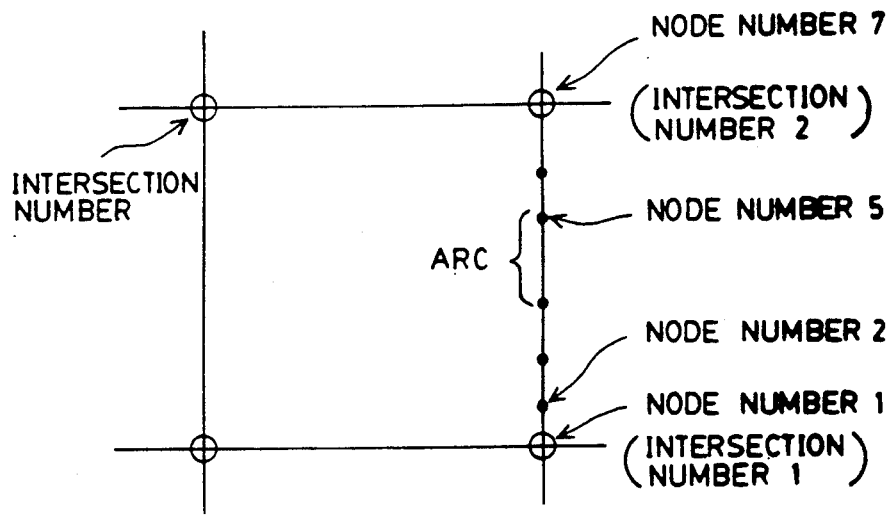

FIG. 5 is a drawing provided for explaining the basic idea of the data structure of a map. As shown in FIG. 5(a), a map is shown not only by intersections but also guidance information for effective points between intersections, for example, points having a bridge, a river, a building, a gasoline station and so on are shown using the idea of nodes, and portions between the respective nodes are shown by using the idea of arcs. Thus, a node represents data for the coordinates of a geographical point, and an intersection is one of the nodes. On the other hand, an arc represents column data and a road.

Figure 5B:
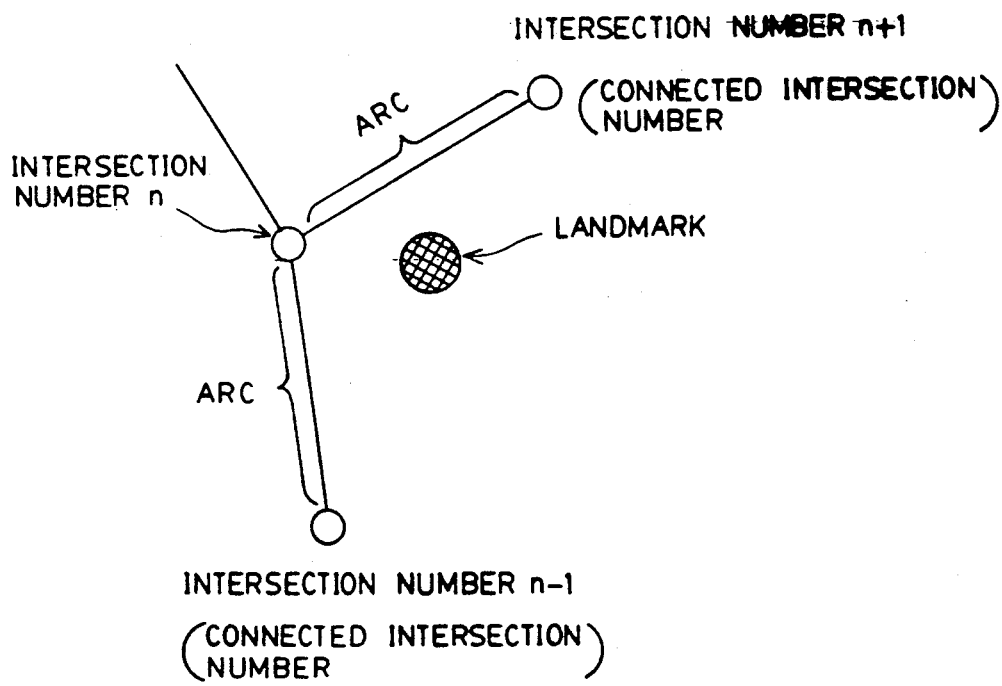

The above-described arrangement enables a mark to be output as data serving as effective guidance information in a portion between the roads connecting the intersections of the numbers before and after the intersection of number n, i.e., between two intersections, in FIG. 5(b).

FIG. 6 shows column data of the above-described nodes, the east longitude and the north latitude, i.e., the coordinates of a point, and effective guidance information for an attribute such as a bridge, a river, a building, a gasoline station or the like, which are distinguished as data, being stored for each node number.

FIG. 7 shows an example of an intersection list in which code numbers, intersection names, intersection numbers, i.e., the numbers of the nodes which are applied only to the intersections, and the numbers of two connected nodes, the landmarks and attributes, as described above for FIG. 5(b), are stored.

FIG. 8 shows an example of a destination list in which code numbers, destination names, parking lot numbers, the numbers of two connected intersections, parking lot directions, i.e., information such as the right or left hand of a road or a straight advance, photograph numbers of the two connected intersections, photograph numbers of parking lots, block data for respective areas and coordinates, i.e., the east longitudes and the north latitudes, are stored.

The attributes of destinations can be distinguished by genre. For example, the following numerals may be applied at the uppermost position of a code number:
0 ... sight-seeing, 1 ... public institution, 2 ... lodging, 3 ... meal, 4 ... business office, 5 ... gasoline station, 6 ... intersection, 7 ... parking lot, 8 ... souvenir and others.

Alternatively, other attribute data may be added. The above-described destination data represents parking lots near the destination. Since the destination is a parking lot, the connected intersections numbers, the directions of parking lots (the right or left hand of a road, or a straight advance), the photograph numbers of the connected intersections and the photograph numbers of the outlets of the parking lots are displayed so that the vehicle can be surely guided to the destination.

FIG. 9 shows an example of parking lot data in which the number of parking lots, the parking lot numbers, the connected intersection numbers and coordinates are stored.

Figures 10A, 10B:
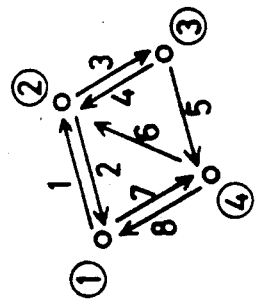

FIG. 10(a) shows an example of road data in which road numbers with directions which are applied to roads, as shown in FIG. 10(b), the node numbers of the starting point and the terminal of each road, the road number next to the road number having the same starting point, the road number next to the road number having the same terminal, road thickness, information for traffic isolation, unnecessary guidance information (for example, in the case of a straight advance alone), photograph numbers, the number of nodes, the address at the top of each node column data and so on are stored.

A description will now be give of the input of a destination with reference to FIGS. 11 to 13.

FIG. 11 shows a flow of the processing in which the genres shown in FIG. 12(a) are displayed on a screen when a destination is first input in Step 101. In this case, items of high frequency, e.g., "sight-seeing", "lodging", "souvenir", "code number input" and "return", are displayed in red as selection items, and one of the genres is selected by input from a touch panel. In Step 3, a decision is then made as to whether or not the item "return" displayed on the screen shown In FIG. 12(a) is input. In the case of NO, a decision is made as to whether or not a node number is input in Step 106, while in the case of YES, the processing advances to Step 112.

In the case of NO in Step 106, when the parking lot (destination) list of the item selected is read from CD-ROM in Step 107, the screen shown in FIG. 12(b) is displayed (Step 108), as well as a speech "select a desired destination" being output. In this step, items of high frequency are displayed, and an intended parking lot can be selected and specified by touching a before page key or a next page key, the whole of the input display portion being displayed in red. The item "code number input" is displayed at the last of the items displayed. When "before page" is input at the first page, the processing returns to Step 101.

When the intended parking lot is then input from a touch panel (Step 109), the confirmation screen shown in FIG. 12(c) is displayed in Step 110. In this screen, the background of the item selected becomes blue, while the backgrounds of the other items become dark blue, so that recognition can be easily conducted. In the case of "cancel", the processing returns to Step 108, and in the case of "OK", a decision is made in Step 111 whether a parking lot name is present or a code number is input. If the parking lot is the destination, the processing advances to Step 119 in which data corresponding to the parking lot name is read from CD ROM, and data for the destination is set in the memory region of CPU.

When the item selected is changed to "code number input" is selected in Step 111 or when the item "code number input" is selected in Step 106, the code number input screen shown in FIG. 13(a) is displayed in Step 112. When the code number of the intended parking is input from the touch panel in Step 113, a decision is made as to whether or not the code number specified is correct. If the code number is incorrect, "the code number specified is incorrect" is displayed in Step 115, and the processing returns to Step 113. If the code number specified is correct, a decision is made as to whether or not the code number is an intersection code in Step 116. If the code number is not an intersection code, the processing proceeds to Step 118 in which the destination is automatically displayed, as shown in FIG. 13(b). If "OK" is selected, the processing proceeds to Step 119 in which data corresponding to the parking lot is read from the CD-ROM, and the data on the destination is set in the memory region of CPU. If "cancel" is selected, the processing returns to Step 113.

If the code number specified in Step 116 is an intersection code, "no intersection code number can be input" shown in FIG. 13(c) is displayed in Step 117, and the processing returns to Step 113. After the above-mentioned routine has been executed, when "return" is input in Step 101, the screen shown in FIG. 13(d) is displayed in Step 103, 104. In the case of OK, the initial data of the starting point is copied in the destination data region (Step 105).

A description will now be given of the input of the present position at an intersection with reference to FIGS. 14 to 16.

Figure 14:
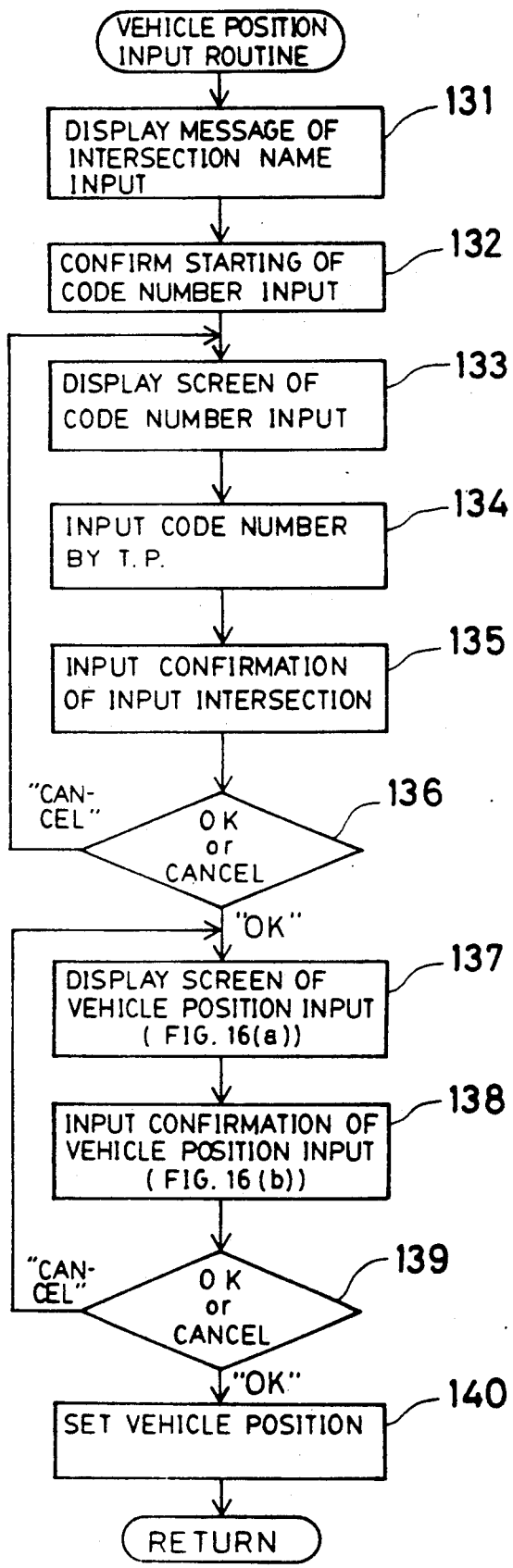
FIG. 14 is a flow chart in an example of a method of inputting a present position.

FIG. 14 shows a flow of the process of setting a vehicle position in which the message of intersection name input shown in FIG. 15(a) is first displayed in Step 131. The driver continues traveling, and stops the vehicle immediately after the driver has passed through the intersection with a name. When the driver then inputs the intersection number with reference to the instruction manual (Step 132), the code number input screen shown in FIG. 15(b) is displayed (Step 133). When a code number is input from the touch panel (Step 134), the intersection node shown in FIG. 15(c) is displayed in Step 135. In this step, if the input code number is incorrect, the incorrectness is indicated.

Figure 16A:
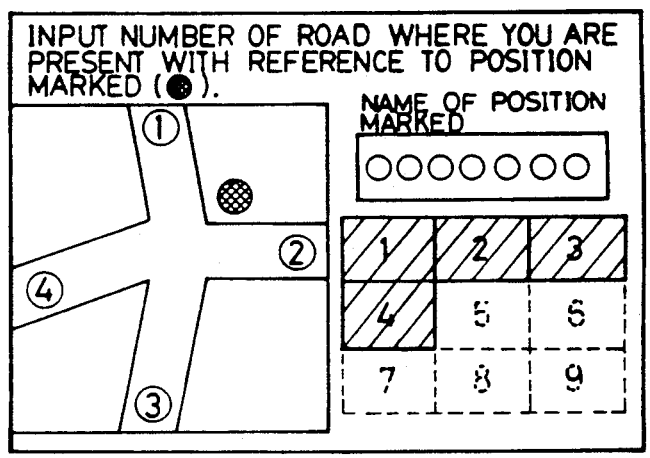

A decision is made in Step 136 whether the intersection name is correct or cancelled. In the case of "cancel", the processing returns to Step 133, and in the case of "OK", the processing advances to Step 137 in which the process of displaying the vehicle position input screen is executed in Step 137, and the screen shown in FIG. 16(a) is displayed. In this screen, an intersection form is displayed by using intersection number of the code number input which is read from the intersection list data and the road data and node data for the roads connected to the intersection. The roads at the intersection are numbered so that the road numbers can be input from the ten keys, the numbers of the ten keys only of the roads at the intersection being displayed in red. The mark is displayed at the position at the angle of half the angle formed by the arcs between the two intersections together with the name thereof.

Figure 16B:
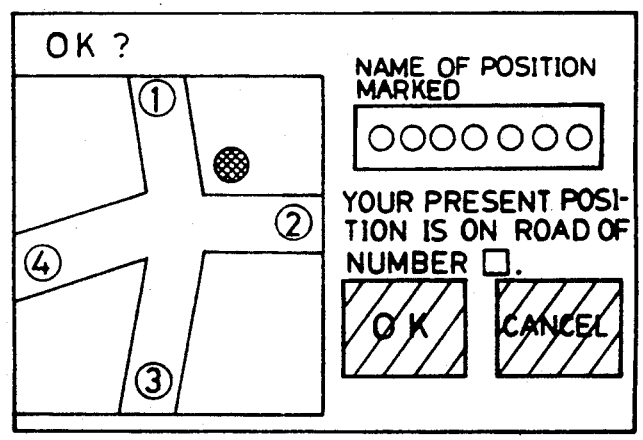

When the driver inputs the number of the road where the driver is present with reference to the position of the mark, the screen shown in FIG. 16(b) is displayed in Step 138, and the number of the road of the present position is displayed. In Step 139, a decision is made as to whether "OK" or "cancel" is selected. If "cancel" is selected, the processing returns to Step 137, while if "OK" is selected, the vehicle position is set as the present position at the position at a given distance (for example, 70 m) from the start point node on the specified node (Step 140).

In the process of setting the vehicle position, the intersection form displayed on the screen shown in FIG. 16(b) is formed by selecting the road with the start point number, which is the same as the specified intersection number, i.e, the road having the specified intersection, from the road data shown in FIG. 10 on the basis of the intersection number specified by inputting the intersection name as a code number, and by converting the node column data from map coordinates to screen coordinates on the basis of the top addresses of the node column data.

A description will now be given of the destination guidance method which is characteristic of the present invention.

Figure 17:
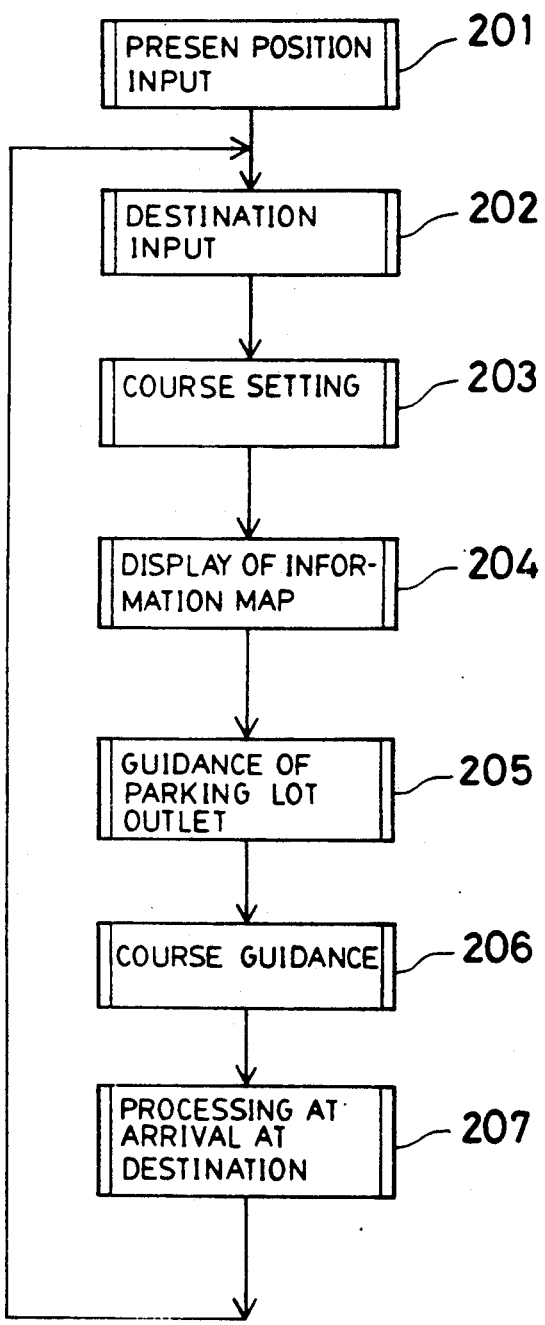
FIG. 17 is a flow chart of processing in another example of navigation.

The flow of the normal operations is first explained below with reference to FIG. 17. In Step 201 in which the present position, i.e., the starting point, is input, when a reset switch is pushed, the present position is selected from the destination list which was previously stored and set as an initial starting point. This state is maintained until the reset switch is again pushed.

In Step 202, a destination is input (refer to the description for FIGS. 10 to 12).

In Step 203 in which a course is set, the course from the outlet of the parking lot at the present position to the inlet of the parking lot at the destination is automatically explored on the basis of the network data which was previously stored and which comprises the intersections and arcs between the respective intersections, and the results of the exploration are output as column data of the intersections in the course, as well as the course being output and stored as a node column using the map data represented by nodes and arcs for the purpose of detecting the present position.

In Step 204 in which the guidance map is displayed, a map on a reduced scale containing the destination and the present position is displayed on the basis of the map data and the course node data, which were previously stored, the present position, the destination and the course being shown in the map. The destination name, the next intersection name, the direction of progress and the remaining distance at the next intersection and the remaining distance to the destination are also indicated.

In guidance of the outlet of a parking lot in Step 206, the direction of progress at the outlet of the parking lot and the photograph of the outlet are displayed, and the detection of the present position is started at the outlet.

In course guidance in Step 206, the photograph of the scene at the next guidance intersection, the name of the intersection, the form thereof, the remaining distance to the intersection, the features in the photograph of the scene and the direction of progress at the intersection are indicated. Guidance is performed by switching the guidance map and this screen. The intersections on the course are indicated in turn each time the passage of an intersection is detected by the present position detecting means until the driver arrives at the destination.

In the processing at the arrival at the destination in Step 207, the destination is set as the present position so that the destination can be input.

A description will now be given of the guidance of parking lots in the destination, which is characteristic of the present invention, with reference to FIGS. 18 to 20.

Figure 18:
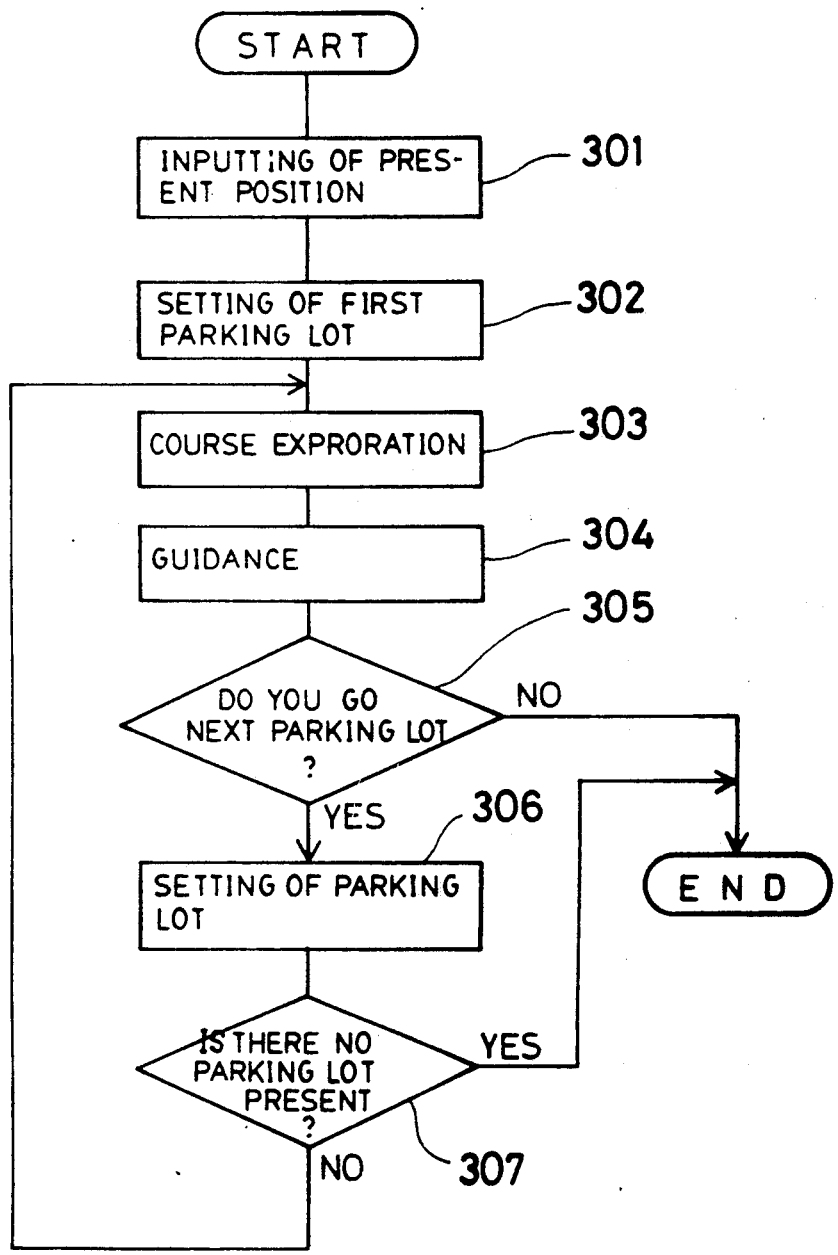

FIG. 18 shows the flow of navigation in which a first parking lot is automatically set by inputting the present position and the destination (Steps 301, 302). When the driver arrives at the intended parking lot through the exploration of the course in Step 303 and the guidance in Step 304, a decision is made whether or not the driver will go to another parking lot in Step 305. If parking is possible, the processing is completed, while if the first parking lot is full of cars, a process of setting another parking lot is performed in Step 306. In Step 307, a decision is made whether or not any other next parking lot is present. If the next parking lot is absent, the processing is completed, while if the next parking lot is present, the processing returns to Step 303 in which the course is explored and proceeds to Step 304 for the guidance.

FIG. 19 shows a flow of the above-described process of setting a parking lot.

Figure 19A:
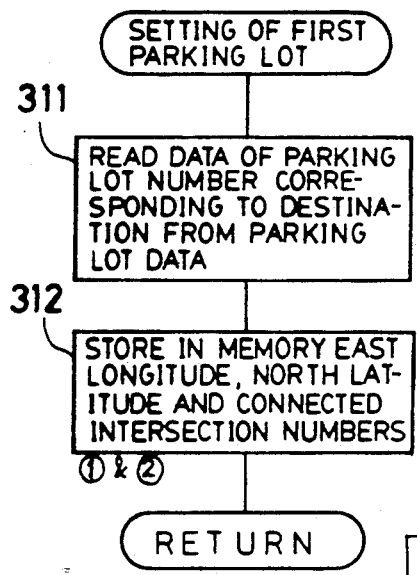

In Step 302 shown in FIG. 18 in which the first parking lot is set, as shown in FIG. 19(a), the data of the parking lot number corresponding to the destination is read from the parking lot data shown in FIG. 9 in Step 311, and the east longitude, the north latitude and the numbers of the intersections 1, 2 connected to the destination are stored in the memory in Step 312.

Figure 19B:
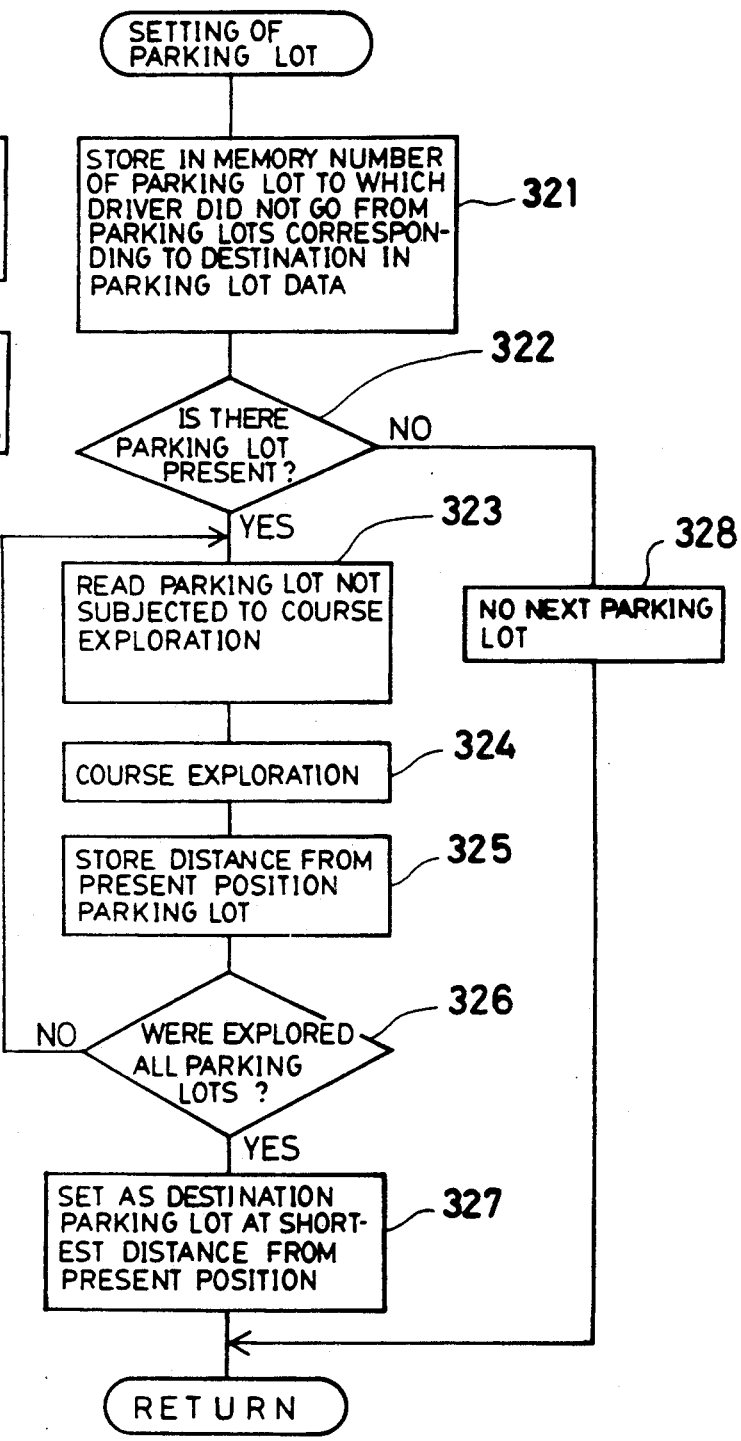

In Step 306 shown in FIG. 18 in which a parking lot is set, as shown in FIG. 19(b), the numbers of the parking lots to which the driver did not go in the parking lot numbers corresponding to the destination are first read from the parking lot data shown in FIG. 9 and stored in the memory in Step 321, and a decision is then made whether or not a parking lot is present in Step 322. If there is no parking lot, the processing goes to Step 328 in which "no parking lot" is input, while if there is a parking lot, the processing goes to Step 323 in which a parking lot which is not subjected to the course exploration is selected. The parking lot is subjected to the course exploration in Step 324, and the distance from the present position to the parking lot is stored in Step 325. Then, the processes in Steps 323 to 325 are repeated until all the parking lots are explored in Step 326. After all the parking lots have been explored, the parking lot at a shortest distance from the present position is input as the destination in Step 327.

Figure 20:
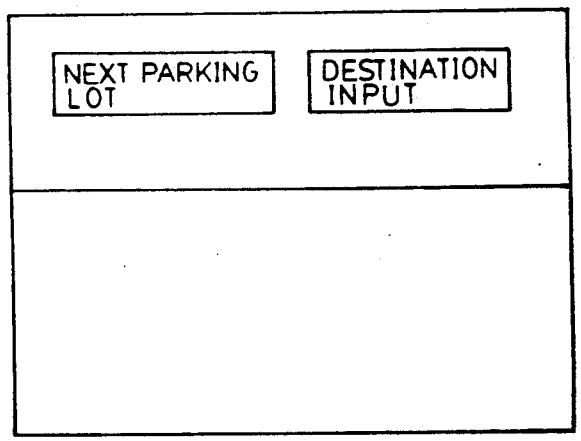

FIG. 20 shows an example of the screen displayed when whether or not the driver will go to the next parking lot is input.

The present invention is not limited to the above-mentioned embodiment and can be changed into various forms.

For example, the navigating apparatus of the present invention may be combined with a conventional apparatus provided with a distance sensor and a steering angle sensor so that a given position can be automatically recognized by other means in the navigating apparatus instead of recognition of the next point effected only when the driver operates a switch.

In combination of the present invention with another apparatus, for example, a method employing a sensor and a method in accordance with the present invention may be properly used for an area with monotonous roads such as a straight road and an area with complicated roads, or the present invention may be used as a backup of a conventional navigating apparatus which is damaged.

In addition, information of a distance between guidance positions may be provided so as to call upon the driver to input and specify (input a trigger) the next position by using a speech or a display on the basis of the distance determined by a distance sensor.

Furthermore, in the case of an arrangement in which a desired course such as an alley route or a main line route can be set, information as to whether or not a position is an object may be provided to each of positions so that course exploration is effected only at the positions to be considered by specifying desires during setting of guidance information.

INDUSTRIAL APPLICABILITY

The destination guidance method of a vehicle navigating apparatus of the present invention is loaded on an automobile so as to be applied to the fields of guidance along the course to a destination and guidance along the course to a parking lot in that destination.

What is claimed is:

1. A vehicle navigating apparatus comprising:
   input means for inputting a present position of a vehicle and a selected destination;
   memory means for storing guidance information including destination data for a plurality of destination, road data and intersection data, said destination data including parking lot data identifying the locations of a plurality of parking lots proximate to at least said selected destination;
   computing means for computing the distances between the present position and each of said parking lots proximate said selected destination and for inputting the parking lot found to be closest to the present position as the selected destination;
   course determination means for determining a course from the present position of the vehicle to said closest parking lot, based on the stored guidance information; and
   display means for displaying guidance information for guiding a driver along the determined course.

2. The vehicle navigating apparatus of claim 1 further comprising:
   reset means for resetting said present position as the previously selected destination and said selected destination as another of said proximate parking lots.

3. A vehicle navigating apparatus according to claim 1 wherein said parking lot data includes codes for said plurality of parking lots correlated with a given destination, codes for intersections correlated with the codes for the parking lots with which said intersections connect, and map coordinates for each of said plurality of parking lots.

4. A vehicle navigating apparatus comprising:
   input means for inputting a present position of a vehicle and a selected destination;
   memory means for storing guidance information including destination data for a plurality of destinations, road data and intersection data, said destination data including parking lot data identifying the locations of a plurality of parking lots proximate to at least said selected destination;
   computing means for computing the distances between the present position and each of said parking lots proximate said selected destination and for inputting the parking lot found to be closest to the present position, as the selected destination;
   course determination means for determining a course from the present position of the vehicle to said closest parking lot, based on the stored guidance information;
   means for redetermining the course at each intersection responsive to present position input at the intersection; and
   display means for displaying guidance information for guiding a driver along the redetermined course.

5. The vehicle navigating apparatus of claim 4 further comprising:
   reset means for resetting said present position as the previously selected destination and said selected destination as another of said proximate parking lots.

6. A vehicle navigating apparatus according to claim 4 wherein said parking lot data includes codes for said plurality of parking lots correlated with a given destination, codes for intersections correlated with the codes for the parking lots with which said intersections connect, and map coordinates for each of said plurality of parking lots.

* * * * *